BRIGGS & TALBOT.
Grain Winnower.
No. 9,631.  Patented March 29, 1853.
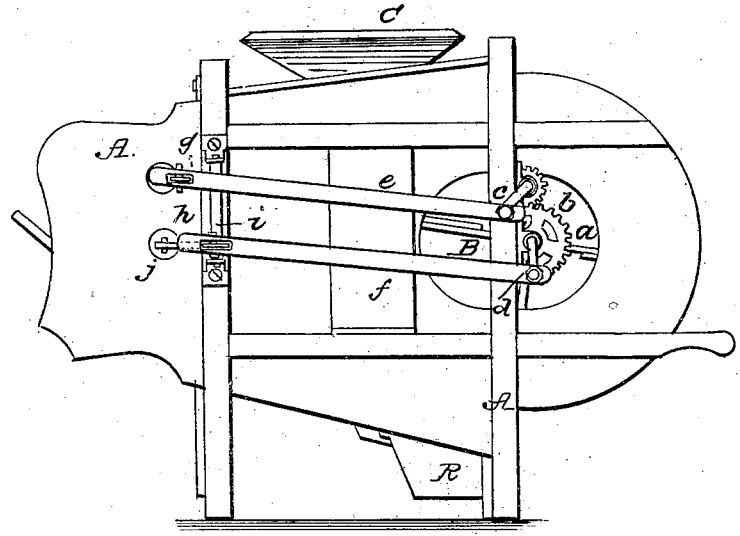
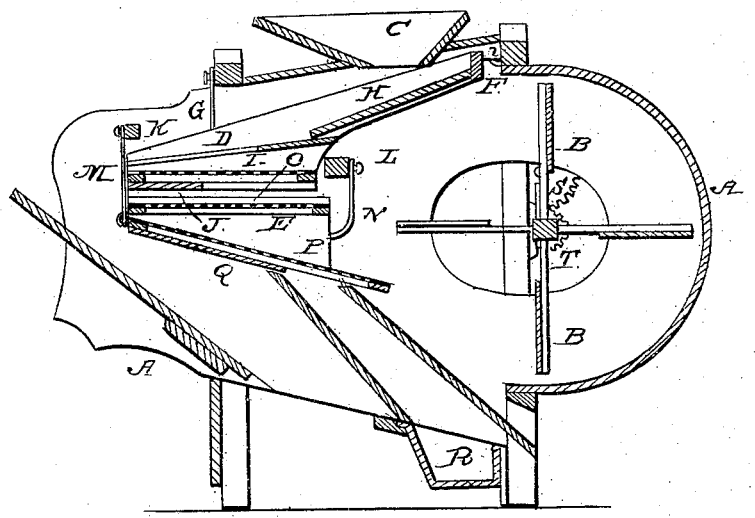

UNITED STATES PATENT OFFICE.

SCHUYLER BRIGGS AND JNO. G. TALBOT, OF SLOANSVILLE, NEW YORK.

WINNOWER OF GRAIN.

Specification of Letters Patent No. 9,631, dated March 29, 1853.

*To all whom it may concern:*

Be it known that we, SCHUYLER BRIGGS and JOHN G. TALBOT, of Sloansville, in the county of Schoharie and State of New York, have invented a new and useful Improvement in Fanning-Mills; and we do hereby declare the following to be a full, clear, and exact description thereof, reference being had to the annexed drawings and letters of reference marked thereon, forming part of this specification, in which—

Figure 1, is a side elevation. Fig. 2 is a central longitudinal section.

The same letters on the two figures refer to the same parts.

The nature of our invention consists in causing the upper sieve or riddle I to vibrate at a greater speed than the screens O, P, for the purpose of more effectually separating the impurities from the wheat, the quick movement of the riddle having the effect to increase the agitation of the wheat or seed, thus causing the chaff and light matter to be separated from the grain or seed and blown from the riddle more readily.

The frame A, is made of the usual form and construction of fanning mills.

B is the fan or blower.

C is the hopper at which the grain is introduced.

The shoe of this mill is made in two sections D, E. The section D, being the upper, extends beneath, and back of the hopper, and is suspended to the upper timber at F, while the lower front end is hung upon two loose rods or straps G. It has an inclined board H, which conducts the grain from the hopper to the riddle I, beneath the front portion of which riddle, is a receiving board J, which serves to deliver the grain that descends from the riddle onto the rear portion of the screen O, and thereby subject the grain to a greater amount of blast from the shoe. This upper section D, has a quick vibration for the purpose of cleaning the wheat more effectually by giving it increased motion.

E, is the lower section of the shoe, arranged directly beneath the riddle, and hung front, and rear, to two timbers K, L, by loose rods M, N. It has a screen O, and a lower inclined screen P, and a board Q, at the bottom thereof, for conducting the cheat, cockle and other impurities smaller than the grain as it passes through the screens, to a receiver R, while the cleaned grain will pass off at the rear of the inclined screen P.

The fan receives its motion from gearing S, T, see Fig. 2, the short shaft of the wheel S having a crank handle by which to give motion. Bands and pulleys may be used instead of the aforesaid cogged wheels.

The sections D, E, of the shoe are operated by the following devices:—On the end of the fan shaft there is a cog wheel $a$ into which matches a pinion $b$ situated above the wheel $a$. From the shaft of the pinion, as well as the fan, projects a crank $c$ $d$ from which lead two connecting rods $e$ $f$, the opposite ends whereof are united to two bell cranks $g$ $h$ of a spindle $i$, and these bell cranks are attached separately by rods $j$ to each section of the shoe. Now it will be seen, that in proportion as the wheel $a$ is large, and the pinion $b$ small, that a corresponding fast motion will be given to the upper section D, through the connecting rod $e$, and, that by having the pinion T on the fan shaft, matching with the propelling cog wheel S a comparative slow motion is given to the lower section E, through the connecting rod $f$.

Of course it will be understood that the proportions of the several parts may be varied at pleasure and that bands and pulleys may be substituted for cog wheels wherever required and that the motion of the parts may also be changed at pleasure.

Having thus described our improvements in the fanning mill, what we claim as new and desire to secure by Letters Patent, is—

Causing the upper sieve or riddle I, to vibrate at a greater speed than the screens O, P, in the manner and for the purpose herein set forth.

In testimony whereof we have hereunto signed our names before the subscribing witnesses.

SCHUYLER BRIGGS.
JOHN G. TALBOT.

Witnesses:
WM. P. ELLIOT,
J. M. SHOUT,
JOHN L. SMITH.